United States Patent [19]

O'Kelley

[11] Patent Number: 4,825,811

[45] Date of Patent: May 2, 1989

[54] ANIMAL FEEDING DEVICE

[76] Inventor: Charles O'Kelley, E. Rt. 16, Shelbyville, Ill. 62565

[21] Appl. No.: 820,625

[22] Filed: Jan. 21, 1986

[51] Int. Cl.⁴ .............................................. A01K 5/00
[52] U.S. Cl. ..................................... 119/51.5; 119/54
[58] Field of Search ................... 119/52 AF, 53.5, 54, 119/52 A, 51.5, 56 R; 222/544

[56] References Cited

U.S. PATENT DOCUMENTS

| 70,401 | 11/1867 | Bowerman | 119/54 X |
| 1,021,209 | 3/1912 | Platt | 119/51.5 |
| 1,694,925 | 12/1928 | Morrison | 222/544 |
| 3,536,046 | 10/1970 | Lippi | 119/51.5 |
| 4,461,240 | 7/1984 | Ostler | 119/51 R |

FOREIGN PATENT DOCUMENTS 329278 6/1958 France ............................. 119/53.5
215942 5/1924 United Kingdom ................. 119/54

Primary Examiner—Robert P. Swiatek
Assistant Examiner—Nicholas D. Lucchesi
Attorney, Agent, or Firm—Wallenstein Wagner Hattis & Strampel, Ltd.

[57] ABSTRACT

An animal feeding device, especially for pigs, has an overhead feed metering or regulation mechanism formed of a cylindrical member resting in a slot across the bottom of a feed hopper to close the slot and prevent feed from falling from the hopper. The bottom of the member is accessible from below the slot and the pig causes feed to fall from the slot by pushing the member up with its nose to open the slot. When the member is released by the pig, it falls back down into the slot to close same. The member can be a tube or pipe retained in operable open and closed position by a rod extending therethrough.

6 Claims, 2 Drawing Sheets

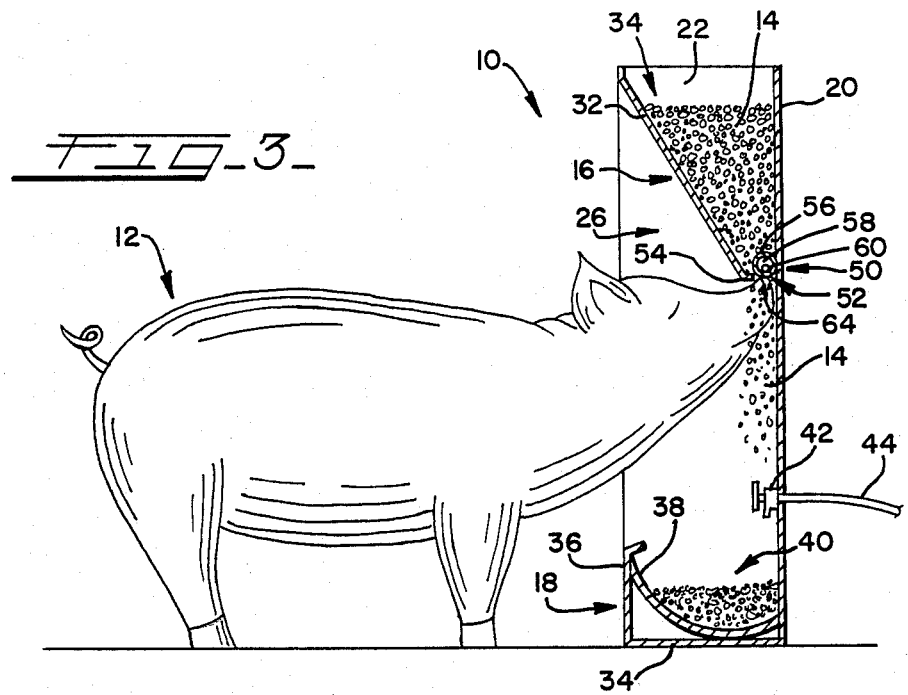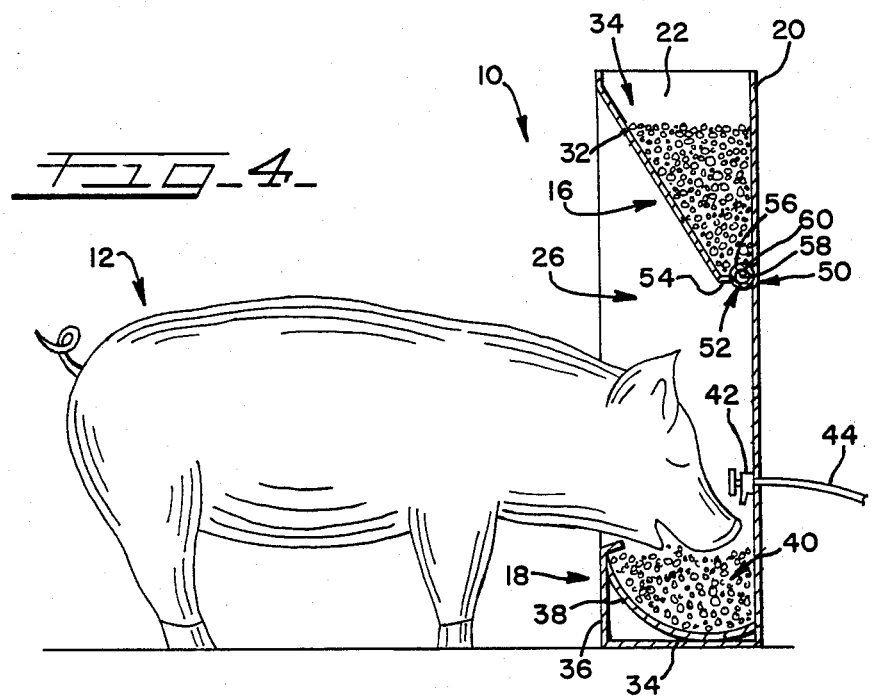

ANIMAL FEEDING DEVICE

BACKGROUND OF THE INVENTION

This invention relates generally to feeding devices for livestock animals and particularly to feeding devices for pigs. The invention finds particular utility in sow farrowing crates but is believed to have much broader application.

Pig and cattle feeding devices are well known for supplying regulated quantities of feed from an elevated hopper to a low feeding trough for "full feeding" the animal to obtain maximum body weight increases. The devices are arranged to be operated by the animal moving a bar or lever to release the regulated quantities of feed from the hopper to the trough as the animal desires.

The known devices have been concerned with several problems associated with automatic feeding of stock. Such devices must be of simple design to allow operation by livestock yet be of robust construction to withstand physical abuse and corrosion resulting from contact with animal saliva and manure acids. The hopper must be arranged to provide full flow of feed therethrough without any dead spots in which feed can be lodged and deteriorate and the trough must likewise be arranged to encourage the animal to eat the feed therein before it deteriorates or becomes contaminated.

In a confined space of a sow farrowing crate, where the sow nurses her piglets, it could be beneficial if the feeding device somehow were able to provide exercise for the sow. This would maintain her muscle tone and increase the care she otherwise could provide her piglets. The portions of the sow's body that particularly need increased exercise are the large muscles across the shoulder, back and loin area. Known modern feeding devices fail to provide this exercise because they guide feed to the feeding trough from just above or behind the trough so the sow never is forced to raise her head.

Further, it could be beneficial if the feeding device provided an excess supply of water to the sow in the farrowing crate. This would provide extra water for nursing and maintaining normal body fluids and coupled with increased exercise could reduce or eliminate constipation. Of course, the excess supply of water should be provided in a manner that does not increase feed wastage.

SUMMARY OF THE INVENTION

These and other desireable aspects are achieved by a feeding device that has a novel overhead metering arrangement for regulating feed falling from an overhead hopper to a low trough. The hopper presents a bottom slot extending the entire width of the hopper. A cylindrical member having a diameter greater than the width of the slot, so it can rest against the edges of the slot, closes the slot under action of gravity from interior the hopper. Feed placed in the hopper is thus prevented from passing downwardly through the slot by the cylindrical member, and feed is allowed to fall from the hopper to the trough by the animal selectively, and simply, raising the member with its nose from below the slot to form openings between the member and slot edges. When the animal later lowers its nose, gravity and the weight of the overbearing feed causes the member again to seal against the edges of the slot and stop flow of feed from the hopper. With the slot and member arranged above the shoulders of the animal, the arrangement forces exercise of shoulder, back and loin muscles each time feed is desired by the animal.

The arrangement is mechanically simple to construct and for the animal to operate. The slot extending the width of the hopper eliminates any dead spots in the hopper in which feed can deteriorate and the overhead metering or regulation arrangement encourages the animal to eat more of the food in the low trough before it has to raise its head above its shoulders to access more food.

In a preferred embodiment, vertically extending rear and opposed side walls form a frontwardly opening chamber. A plate connected between the three walls at the bottom margins of the chamber forms an upwardly opening feed trough from which the animal can eat. A hopper wall extends between the opposed side walls of the top of the chamber and closes off a portion of the chamber into a feed hopper that can be open to the top. A lower edge of the hopper wall is closely spaced from the rear wall to form the slot and the member is dimensioned in diameter to hang below said slot and be accessible from below said slot by the animal's nose.

Preferably the slot and member are of uniform width and diameter, respectively, well to mate and seal with one another and the member has a length substantially the distance from side wall to side wall.

The regulation means and trough arrangement thus encourage the animal to raise and lower its head for feeding and achieve the desired exercise of the animal's shoulders, back and loin muscles. Providing a nose-operated valve low in the device to flow water into the trough with the feed encourages overwatering the animal to maintain good body fluids. The device can be fabricated from a single sheet, for example of such as stainless steel, to form the rear and side walls with separate sheets of stainless steel joined thereto for the bottom wall of the trough and the upper, hopper wall.

The cylindrical member can be solid or preferably can be a hollow tube or pipe retained in position over the slot by a solid rod passing therethrough and anchored at its ends to the opposed side walls. The rod thus prevents the pipe member from being raised out of position where it cannot fall back into engagement with the slot to seal same.

BRIEF DESCRIPTION OF THE DRAWING

FIG. 3 is a median side sectional view of the device with the regulator being operated by a pig; and FIG. 4 is a median side sectional view of the device with the pig eating from the trough.

DESCRIPTION OF THE PREFERRED EMBODIMENT

Figure 1:
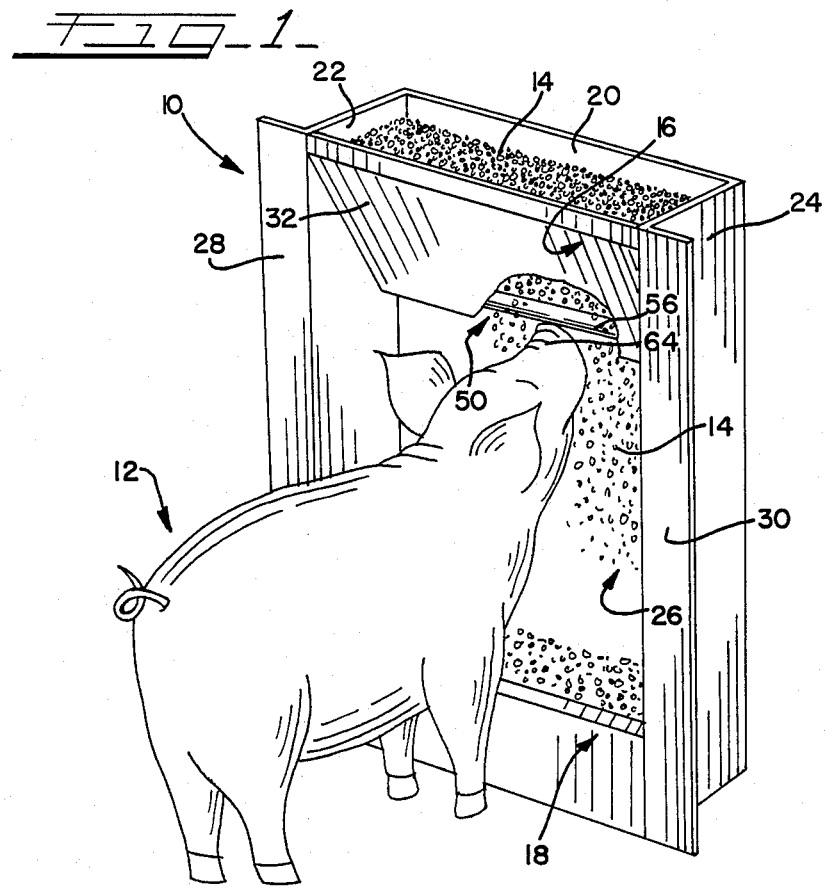
FIG. 1 is a perspective view, partly in section, of a feeding device according to the invention from which feed is being dropped from the hopper by a pig.

Referring to FIG. 1, feeding device 10 is being operated by a pig 12 dropping granular feed 14 from a hopper portion 16 to a trough portion 18. The feeding device 10 includes a vertically extending rear wall 20 and a pair of opposed side walls 22 and 24 joined together to present a forwardly opening chamber 26, with the side walls terminating in facing flanges 28 and 30.

Referring also to FIGS. 3 and 4, hopper portion 16 includes a hopper wall 32 extending between the side walls and extending downwardly and inwardly of said chamber 26 toward the rear wall 20 to close off most of the bottom of an open topped hopper 34. The angle at which the hopper wall 32 is arranged is selected to be greater than the angle of repose of the grain inserted in the hopper 34 so that when grain or other feed is emptied from the bottom of the hopper, there will be no "dead" spots in the hopper in which feed can be trapped and deteriorate.

Feed trough 18 includes a bottom plate 34, a front plate 36 and an arcuate trough wall 38 extending between the rear wall 20 and opposed side walls 22 and 24 at the bottom of chamber 26. This forms an upwardly open trough 40 capable of holding feed that has fallen from hopper 34 in a manner available to pig 12 for feeding therefrom. The trough is sealed at its edges by such as welding to hold water with the feed. The water can be from such as a nose-operated valve 42 supplying water from a pipe 44.

Figure 2:
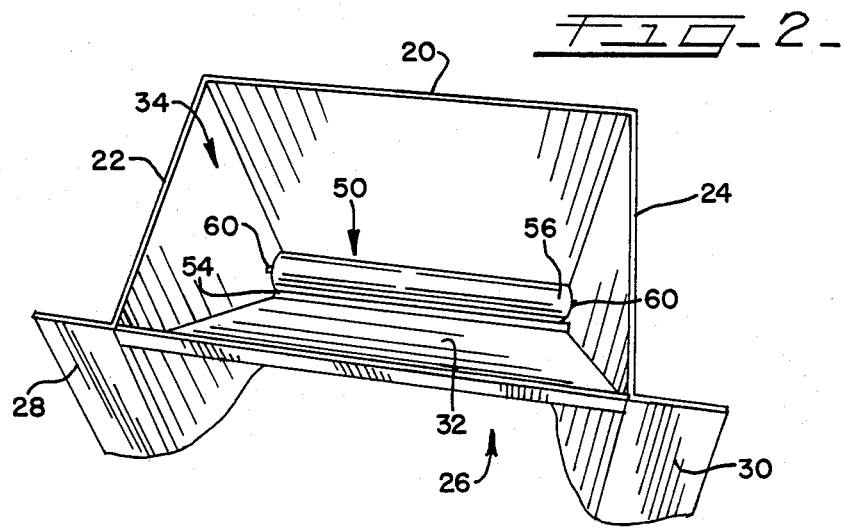
FIG. 2 is a top perspective view of the device looking into the top of the hopper.

Referring also to FIG. 2, a metering or regulating mechanism 50 is located or formed at the bottom of hopper 34. Regulation mechanism 50 includes a slot 52 formed by the lower edge 54 of the hopper wall 30 being spaced from the rear wall 20 an equal distance extending between the side walls 22 and 24 to form an elongate, rectangular open slot at the bottom of hopper 34. This slot is closed by an elongate cylindrical member 56, having a diameter greater than the width of the slot so that it doesn't fall through the slot, that rests and seals against on the lower edge 54 of the hopper wall 32 and the rear wall 20. The member 56 has a length substantially that of the length of the slot between the opposed side walls to close off the slot thereof.

Preferably, member 56 is a tube or pipe having an opening 58 therethrough. A rod 60 is mounted between the side walls 22 and 24 and is arranged through opening 58 in member 56. Rod 60 thus maintains the member 56 in position relative to said slot 52 when raised by the animal to flow feed from the hopper so that member 56 will fall under gravity and weight of the feed thereabove back into the slot 52 to close same and stop the flow of feed from the hopper. In the closed position, see FIG. 4, the bottom of member 56 extends below slot 52 to be accessible by the nose 64 of the animal for raising the same. Preferably, slot 52 is arranged above the head or shoulders of the pig 12 or other animal.

In operation, the feed 14 is loaded into the hopper 34. When desired, the pig 12, or other animal, puts its head into chamber 26, lifts its head and pushes up the member 56 to open the feed slot 52 and cause feed 14 to fall under force of gravity from the hopper. This forces the pig or other animal to exercise the large muscles of its shoulders, back and loins every time that it wants to eat. When the pig lowers its nose to eat, the member 56 falls back into slot 52 to close same and stop the flow of feed therefrom. Especially with rod 60 centered in opening 58 through the member 56, the member readily seals against the edge of the slot and rear wall to stop the flow of feed from the hopper automatically without any other intervention.

The feed 14 then falls into trough 40 that can be over-watered by the pig actuating valve 42. Typically the pig or other animal will substantially finish the feed in the trough 40 before raising its head to seek more feed from the hopper, saving in otherwise wasted feed.

The device has been fabricated from a single sheet of stainless steel bent to form the side and rear walls and facing flanges. The bottom plates and trough wall and the hopper wall then are welded to the side and rear walls to complete the structure. The rod ends are then welded to the side walls to finish the device. This design results in an unusually simple fabrication process and low cost for the unit. Of course, other materials and schemes of fabrication are possible. The device has significantly aided the farrowing of piglets by forcing the sow to obtain needed exercise in the limited space of the farrowing crate and excess water is provided to her for nursing and maintaining body fluids.

Modifications and variations of the present invention are possible in light of the above teachings. It is therefore possible that within the scope of the appended claims that the invention can be practiced otherwise than as specifically described.

I claim:

1. An animal feeding device for automatically supplying feed to the animal as the animal desires, comprising:
    A. a vertically extending rear wall and a pair of opposed side walls joined to said rear wall and together forming a frontwardly opening chamber;
    B. a bottom wall extending between said rear and side walls at the lower margins thereof and forming a feed trough therewith adapted to receive and retain feed therein from which the animal can eat;
    C. a hopper wall extending between said opposed side walls and adjacent said rear wall at the top of said chamber to form a feed hopper adapted to receive and retain therein feed to be supplied to said feed through, said hopper wall and rear wall forming a slot therebetween extending from side wall to side wall, said slot adapted to be above the shoulders of said animal and having a uniform width along its length; and,
    D. regulation means located in said slot selectively to open and close said slot in response to operation by said animal at a location above its shoulders to regulate the flow of feed falling from said hopper to said trough under action of gravity, said regulation means including a cylindrical member having a length substantially the length of said slot and a diameter greater than said slot width with the cylindrical member arranged in said hopper and resting in said slot to close same and prevent feed from falling through said slot from said hopper, said cylindrical member being adapted to be raised from below said hopper by the nose of the animal to open said slot and allow feed to fall from said hopper, said cylindrical member is hollow through the length thereof and said regulation means further include a rod extending from side wall to side wall above said slot with the cylindrical member arranged with the rod extending through the hollow thereof to limit the movement of said rod upwardly from said slot.

2. The feeding device of claim 1 including valve means carried on one of said walls actuable by said animal for supplying water to said trough.

3. The feeding device of claim 1 in which said hopper wall extends downwardly from the top of said device and inwardly of said chamber towards said rear wall at an angle greater than the angle of repose of feed that it is adapted to contain so that operation of said regulation means can remove substantially all feed from interior said feed hopper.

4. An animal feeding device for automatically supplying feed to the animal as the animal desires comprising a generally vertically-extending rear wall and a pair of opposed side walls joined to said rear wall, a hopper wall extending between said opposed side walls and cooperating therewith to form a feed hopper, said hopper wall and said rear wall forming a slot of substantially uniform width along its length, and regulating means in and above said slot and vertically movable to open and close said slot in response to operation by said animal, said regulating means including hollow cylindrical means having a length substantially equal to the length of said slot and a diameter greater than said slot width, said hollow cylindrical means arranged in said hopper and resting in said slot to close said slot and prevent feed from falling through said slot, and support means extending from said opposed side walls into said hollow cylindrical member to limit the upward movement of said hollow cylindrical means in response to movement by said animal.

5. An animal feeding device as defined in claim 4, in which said hollow cylindrical means is a single tube open throughout its length and said support means includes a rod extending between said opposed side walls through said tube.

6. An animal feeding device as defined in claim 4, further including a bottom wall extending between said rear and side walls at the lower margins thereof and forming a feed through therewith adapted to receive and retain feed therein from which the animal can eat.

* * * * *